ical Company,
United States Patent [19]
Settineri et al.

[11] 4,455,175
[45] Jun. 19, 1984

[54] METHOD FOR REMOVING OR RETARDING PARAFFIN BUILDUP ON SURFACES IN CONTACT WITH CRUDE OIL

[75] Inventors: William J. Settineri, Midland, Mich.; John G. Charles, Westerville, Ohio; Jerald J. Hinkel, Houston, Tex.; Bradley P. Malone, Kalkaska, Mich.

[73] Assignee: The Dow Chemical Company, Midland, Mich.

[21] Appl. No.: 518,896

[22] Filed: Aug. 1, 1983

[51] Int. Cl.$^3$ .................. B08B 7/04; E21B 37/06
[52] U.S. Cl. ................................ 134/5; 134/21; 134/22.11; 134/30; 134/31; 134/40; 166/304; 252/8.55 B
[58] Field of Search ............. 134/5, 21, 22.11, 22.16, 134/26, 30, 31, 40; 252/8.55 B; 166/304

[56] References Cited

U.S. PATENT DOCUMENTS

| | | | |
|---|---|---|---|
| 1,445,329 | 2/1923 | Lenher | 134/39 X |
| 2,221,353 | 11/1940 | Limerick et al. | 252/8.55 B |
| 2,347,527 | 4/1944 | Vanderbilt | 134/39 X |
| 2,356,254 | 8/1944 | Lehmann et al. | 252/8.55 D |
| 3,279,541 | 10/1966 | Knox et al. | 252/8.55 B X |
| 4,089,703 | 5/1978 | White | 252/8.55 B X |
| 4,105,841 | 8/1978 | Settineri et al. | 526/62 |
| 4,147,638 | 4/1979 | Plummer | 252/8.55 D |
| 4,363,673 | 12/1982 | Settineri et al. | 134/40 X |

OTHER PUBLICATIONS

Chem. Abstracts, "Abstract No. 40330e", vol. 94, 1981, p. 666.

*Primary Examiner*—Marc L. Caroff
*Attorney, Agent, or Firm*—S. S. Grace

[57] ABSTRACT

A sulfur trioxide-containing fluid, e.g., sulfur trioxide gas, is contacted with the surfaces of equipment in contact with crude oil to retard the deposition of paraffins from the crude oil and/or to react with the paraffins already deposited on the equipment surfaces to produce a water-dispersible material which is removed with an aqueous liquid.

13 Claims, No Drawings

METHOD FOR REMOVING OR RETARDING PARAFFIN BUILDUP ON SURFACES IN CONTACT WITH CRUDE OIL

BACKGROUND OF THE INVENTION

A long standing problem in the production, handling, storage and transportation of crude oil is the depositing out of hydrocarbons on the surfaces of such equipment. These hydrocarbons are dissolved in the crude oil at the comparatively high temperatures of underground formations but are insoluble to varying degrees at the temperatures at which most production, handling, storage and transfer equipment are maintained. The accumulation of these hydrocarbons, such as waxes, asphaltenes and resins, (herein collectively referred to as paraffins) can restrict the flow of oil through the equipment and ultimately result in partial or complete plugging. For example, as crude oil is pumped from a production well through production tubing, paraffins deposit on the inner surface of such tubing as the crude oil cools. Similarly, in the transport of crude oils containing soluble paraffins, flow in pipe lines can be restricted by the deposition of these paraffins as the crude oil cools during transport.

Several methods have been used to remove these paraffin deposits including mechanically scraping the equipment surfaces, contacting the paraffin deposits with various organic solvent systems and the application of hot oils or external heat.

Systems have also been used to further inhibit such deposits such as incorporating crystallization modifiers or flow promoters into the crude oil or the application of a magnetic field.

SUMMARY OF THE INVENTION

The present invention stems from the discovery of the beneficial effects of contacting sulfur trioxide with equipment surfaces which have a paraffin deposit thereon or which will come in contact with crude oil under conditions which would otherwise deposit paraffin from such crude oil. The sulfur trioxide can be used to both inhibit the buildup of paraffin deposits and remove the solid paraffins already on the surfaces of such equipment.

In one aspect, the present invention is a method for retarding deposition of paraffins on the surface of equipment in contact with crude oils containing such paraffins which comprises contacting the surface with a sulfur trioxide-containing fluid and thereafter rinsing the surface. This treatment produces a water-wettable surface which effectively reduces the paraffin deposition from crude oils which are later in contact with such equipment surfaces. Water which is often a component in the crude oil is preferentially attracted to the water-wettable surface instead of the paraffins.

In another aspect, the present invention is a method for removing paraffins which have deposited on equipment which has been in contact with crude oil containing paraffins which comprises contacting the paraffin deposit with a sulfur trioxide-containing fluid to react with the paraffin deposit and convert at least a portion thereof to a water-dispersible material and rinsing the surface with an aqueous liquid to remove such material. Preferably, the contact with the paraffin deposit is carried out in the presence of water to react with the sulfur trioxide and thereby produce heat of reaction to melt an additional portion of the paraffin deposit.

These two aspects of the present invention can be combined to provide a method for both removing paraffins already deposited on surfaces contacted by the crude oil and then inhibiting further buildup of such deposits on the cleaned surfaces.

The present method can be used to remove/reduce paraffin deposits that have accumulated in the formation surrounding the wellbore, i.e., around the periphery of the base of the annulus, as well as the tubing.

Thus, a particular embodiment of this aspect of the invention is a method of stimulating a crude oil production well, the production in which has been reduced by paraffin deposit, which comprises
  (a) suspending production in such well,
  (b) passing a sulfur trioxide-containing fluid down the tubing of such well to contact the paraffin deposits on the tubing and in the formation adjacent to the base of the well to convert at least a portion of the paraffins to a water-dispersible material,
  (c) rinsing the tubing and adjacent formation with an aqueous liquid to remove the water-dispersible material, and
  (d) bringing the well back into production.

DETAILED DESCRIPTION OF THE INVENTION

The sulfur trioxide-containing fluid employed in the present invention can be gaseous (vapor) and/or liquid sulfur trioxide as such or as the active component in a fluid system (gas or liquid). The fluid should be one which conveys the sulfur trioxide to the surface to be contacted in such a form to permit the sulfur trioxide to function in the present process. Preferably, the fluid is substantially nonreactive with the sulfur trioxide. Examples of the fluid system include nitrogen, carbon dioxide, air, chlorinated solvents and oleum (fuming sulfuric acid). Carbon dioxide and nitrogen are preferred.

In connection with the inhibiting aspect of the present invention, preferably contact of the equipment surfaces with the sulfur trioxide-containing fluid is accomplished under essentially anhydrous conditions. If the surface to be contacted is water wet, the surface can be first dried by conventional means, for example, by heating to elevated temperatures or contacted with a dry inert gas, such as nitrogen to remove residual surface moisture. For example, in treating the tubing of an operating well, after the production equipment has been partially plugged, a pad or slug of dry nitrogen is pressured at elevated temperature into the wellbore to dry the surface of the tubing which is subsequently contacted with the sulfur trioxide-containing fluid. Alternatively, initial amounts of sulfur trioxide-containing fluid used to convert the paraffins to a water-dispersible material, will also dry the surfaces.

The conversion of the paraffins to a water-dispersible material by contact with the sulfur trioxide can be identified by the reduction/disappearance of crystallinity of the paraffin deposit as determined by differential scanning colorimetry (DSC).

A preferred embodiment of the present invention incorporates both the cleaning of equipment which has already on its surfaces a deposit of paraffins from the crude oil and inhibiting further depositions on those surfaces after they are cleaned. In this embodiment, the sulfur trioxide-containing fluid is initially contacted with the solid paraffin deposit which reacts with the sulfur trioxide to produce a water-dispersible material. At this point, the water-dispersible material can be removed by an aqueous liquid rinse and the thus cleaned surfaces can be dried and contacted with further sulfur trioxide to inhibit the further deposition of paraffins. However, since as above noted, the initial sulfur trioxide contact also dries the surface, further sulfur trioxide can be continually added and the surfaces subsequently rinsed with an aqueous liquid and the surfaces will be both cleaned and inhibited by a single continuous contact of sulfur trioxide.

In connection with the cleaning aspect of the present invention, it is preferable to carry out the contact of the sulfur trioxide-containing fluid with the paraffin deposit in the presence of water so that in addition to the reaction between the sulfur trioxide and the paraffin to produce a water-dispersible material, heat of reaction is also produced by the reaction of the sulfur trioxide with the water to melt additional amounts of insoluble paraffin. The water can be added before or during the contact by the sulfur trioxide or come at least in part from water on the surface of the paraffins or contained therein. Beneficially, the water can contain sodium hydroxide (or other soluble acid neutralizing agent) which will interact with the sulfuric acid producing the additional heat of neutralization. The water-dispersible material formed from the sulfur trioxide and paraffin interaction and the melted paraffin are then flushed and swept out of the equipment, e.g. well tubing formation, by rinsing with an aqueous liquid. The aqueous liquid can be the crude oil/brine mixture of a production well, e.g., the rinse can occur by the start up of the well with the first crude oil/brine mixture flowing past the treated paraffin surfaces. Alternatively, the rinse liquid can be introduced from the top of the well tubing.

The contact time utilized in cleaning and/or inhibiting the equipment surfaces is dependent upon the desired amount of paraffin to be removed and the concentration of the sulfur trioxide in the fluid. In general, the higher the concentration of the sulfur trioxide, the shorter amount of time required to remove a given amount of paraffin deposit and/or inhibit the cleaned surfaces.

EXAMPLE 1

A producing oil well typically shut down every two weeks to one month for removal of paraffin deposits was treated by the method of the present invention. In this particular example, the well tubing and rods were pulled from the well and steam cleaned to remove substantially all of the existing paraffin deposits. The producing tube and rods were placed back into the oil well. The tubing to be treated was first dried by flowing warm (about 130° F.) nitrogen into the well through the tubing and back up the annulus. This not only dried the equipment surfaces but cleared out any residual crude oil from the well which was blown into a storage tank out of the annulus. Sulfur trioxide gas was then introduced down the tubing over a 5-minute period. The sulfur trioxide gas was then held in contact in the well for 20 minutes. After this, an aqueous rinse was applied containing 0.5 weight percent caustic soda. Five hundred gallons of the aqueous caustic flush was used. This was followed by 500 gallons of a clear water flush. Both flushes were applied simultaneously down the tubing and annulus. The well was then put back into service.

For 11 months following this treatment, normal flow of crude oil was observed with no well shutdown for cleaning as was required on a two-week to one-month basis prior to such treatment.

EXAMPLE 2

A section of 3-inch mild steel piping which was used as part of a crude oil pipe line was treated with sulfur trioxide to inhibit the buildup of paraffin from the crude oil. A 4-foot section of the pipe immediately adjacent to the well head was treated with sulfur trioxide. A similar section, untreated, was used in series with the treated section. Both sections were visibly clean when the experiment was started. The contact with the sulfur trioxide was applied by adding solid sulfur trioxide pellets (20 g) to the interior of the 4-foot section of pipe to be treated. Both ends of this pipe section were lightly stoppered and pressure relief provided in one end. By gentle warming (about 95°–100° F.) of the pipe section, the sulfur trioxide was vaporized and thus contacted the internal walls of the pipe. Contact time was for 15 minutes at which time the pipe was flushed with an aqueous solution containing 1 normal caustic soda. This was then connected to the control section of pipe which had not been contacted with the sulfur trioxide. The pipe was then connected to the well head and used to transport crude oil from the well head to a storage tank. After 24 days, the treated and untreated pipe sections were removed and visibly examined. A difference in the paraffin buildup was easily detected between the two sections. The untreated section contained ⅛ to ¼ inch of solid paraffin deposit on the walls of the pipe, while the treated section remained clean.

EXAMPLE 3

A small test vessel was constructed by capping a 3 inch × 1 inch 316 stainless steel pipe nipple at each end. Three holes were drilled in the top cap, a ⅛ inch hole to receive a $SO_3$ injection tube, and two 1/16 inch holes to allow placement of sheathed thermocouples within the small vessel. A paraffin sample was scrapped from an actual fouled crude oil transfer line and used without modification. It was a firm solid at room temperature with a melting point of about 65° C.

Five grams of the paraffin material were melted into the bottom of the vessel, allowed to solidify, and covered with 2 ml of water. The test vessel was placed inside a 350-ml Parr bomb and 2 thermocouples plus a ⅛ inch stainless steel tube inserted through seals in the Parr bomb into the pipe vessel. Liquid sulfur trioxide was pressured into the test chamber by a 25 psi $N_2$ stream. The rate of entry of the $SO_3$ was choked such that 2 ml of $SO_3$ were delivered over approximately 10 seconds.

The temperature in the test vessel rose to about 220° C. within 30 seconds. The temperature remained above 100° C. for about 2 minutes.

The pipe vessel was opened and flushed with room temperature water. Weighing showed that 60 percent or 3 g of paraffin were removed in the water flush. The resultant water flush was brown and cloudy indicating a portion of the paraffin sample was converted to a water-dispersible/water-soluble material.

What is claimed is:

1. A method for retarding deposition of paraffins on the surfaces of equipment in contact with crude oils containing such paraffins which comprises contacting the surface with a sulfur trioxide-containing fluid and thereafter rinsing the surface.

2. The method of claim 1 wherein the surface is contacted with a fluid under essentially anhydrous conditions.

3. The method of claim 1 including the additional step of drying the surface prior to contacting the surface with the sulfur trioxide.

4. The method of claim 3 wherein the drying is carried out by contacting the surface with an inert gas.

5. The method of claim 1 wherein the equipment is oil producing equipment.

6. The method of claim 1 wherein the equipment is an oil transport line.

7. The method of claim 1 wherein the surface has a deposit of paraffin already on it and sufficient sulfur trioxide-containing fluid is added to react with the paraffin deposit and convert at least a portion thereof to a water-dispersible material.

8. The method of claim 7 wherein the contact of the sulfur trioxide-containing fluid is carried out in the presence of water to react with the sulfur trioxide and produce heat to melt at least an additional portion of the paraffin deposit.

9. A method of removing paraffin deposit from equipment which has been in contact with crude oil containing such paraffins which comprises contacting the paraffin deposits with a sulfur trioxide-containing fluid to react with the paraffin deposit and convert at least a portion thereof to a water-dispersible material and thereafter rinsing the surface with an aqueous liquid to remove the water-dispersible material.

10. The method of claim 9 wherein the contact of the sulfur trioxide-containing fluid with the paraffin deposits is carried out in the presence of water which reacts with the sulfur trioxide to produce heat of reaction to melt an additional portion of the paraffin deposit.

11. A method of stimulating a crude oil production well, the production in which has been reduced by paraffin deposit, which comprises
    (a) suspending production in such well,
    (b) passing a sulfur trioxide-containing fluid down the tubing of such well to contact the paraffin deposits on the tubing and in the formation adjacent to the base of the well to convert at least a portion of the paraffins to a water-dispersible material,
    (c) rinsing the tubing and adjacent formation with an aqueous liquid to remove the water-dispersible material, and
    (d) bringing the well back into production.

12. The method of claim 1 wherein the sulfur trioxide containing fluid is gaseous sulfur trioxide.

13. The method of claim 1 wherein the sulfur trioxide containing fluid is gaseous sulfur trioxide in nitrogen.

* * * * *